(12) United States Patent
Sharma et al.

(10) Patent No.: US 11,162,428 B2
(45) Date of Patent: Nov. 2, 2021

(54) METHOD OF STARTING A GAS TURBINE ENGINE

(71) Applicant: General Electric Company, Schenectady, NY (US)

(72) Inventors: Praveen Sharma, Bangalore (IN); Shuvajyoti Ghosh, Bangalore (IN); Narayanan Payyoor, Bangalore (IN); Tod Robert Steen, Cincinnati, OH (US); Carl Lawrence MacMahon, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 15/845,082

(22) Filed: Dec. 18, 2017

(65) Prior Publication Data

US 2019/0186368 A1    Jun. 20, 2019

(51) Int. Cl.
*F02C 7/26*        (2006.01)
*F02C 7/06*        (2006.01)
*F01D 25/34*       (2006.01)

(52) U.S. Cl.
CPC ............... *F02C 7/26* (2013.01); *F01D 25/34* (2013.01); *F02C 7/06* (2013.01); *F05D 2220/32* (2013.01); *F05D 2260/85* (2013.01); *F05D 2270/02* (2013.01); *F05D 2270/114* (2013.01); *F05D 2270/303* (2013.01); *F05D 2270/304* (2013.01)

(58) Field of Classification Search
CPC .... F02C 7/06; F02C 7/264; F02C 9/28; F05D 2260/85; F05D 2270/02; F05D 2270/114; F05D 2270/303; F05D 2270/304; F05D 2270/305
See application file for complete search history.

(56) References Cited

U.S. PATENT DOCUMENTS

| | | | |
|---|---|---|---|
| 6,498,978 B2 | 12/2002 | Leamy et al. | |
| 8,620,565 B2 | 12/2013 | Kadolph | |
| 8,820,046 B2 | 9/2014 | Ross et al. | |
| 8,850,876 B2 | 10/2014 | Ertz et al. | |
| 9,988,987 B2 | 6/2018 | Mouze et al. | |
| 10,174,678 B2* | 1/2019 | Schwarz | F02C 7/268 |
| 10,494,115 B2 | 12/2019 | Zaccaria. et al. | |
| 2005/0271499 A1* | 12/2005 | Loy | F01D 11/025 |
| | | | 415/1 |
| 2014/0373518 A1 | 12/2014 | Manneville et al. | |
| 2014/0373553 A1 | 12/2014 | Zaccaria et al. | |
| 2015/0308347 A1 | 10/2015 | Smith et al. | |
| 2016/0245179 A1* | 8/2016 | Snyder | F01D 25/18 |

(Continued)

*Primary Examiner* — Todd E Manahan
*Assistant Examiner* — David P. Olynick
(74) *Attorney, Agent, or Firm* — Dority & Manning, P.A.

(57) ABSTRACT

A method of starting a gas turbine engine is generally provided. The engine includes a rotor assembly including a compressor rotor and a turbine rotor each coupled to a shaft. The rotor assembly is coupled to a bearing assembly within a casing enabling rotation of the rotor assembly. The method includes determining, based on a lubricant parameter, a period of time within which a rotational speed of the rotor assembly is maintained within a bowed rotor mitigation speed range; rotating the rotor assembly for the period of time within the bowed rotor mitigation speed range; and accelerating the rotor assembly to the combustion speed to ignite a fuel-oxidizer mixture for combustion.

15 Claims, 3 Drawing Sheets

(56) References Cited

U.S. PATENT DOCUMENTS

| | | |
|---|---|---|
| 2016/0348588 A1 | 12/2016 | Ross et al. |
| 2017/0234158 A1 | 8/2017 | Savela |
| 2017/0234230 A1 | 8/2017 | Schwarz et al. |
| 2017/0234233 A1 | 8/2017 | Schwarz et al. |
| 2017/0234234 A1 | 8/2017 | Pech et al. |
| 2017/0234283 A1* | 8/2017 | Ulrey .................. F02M 59/462 123/446 |
| 2017/0241285 A1 | 8/2017 | Bennauer et al. |
| 2018/0230946 A1* | 8/2018 | Virtue, Jr. ................. F02C 9/42 |

* cited by examiner

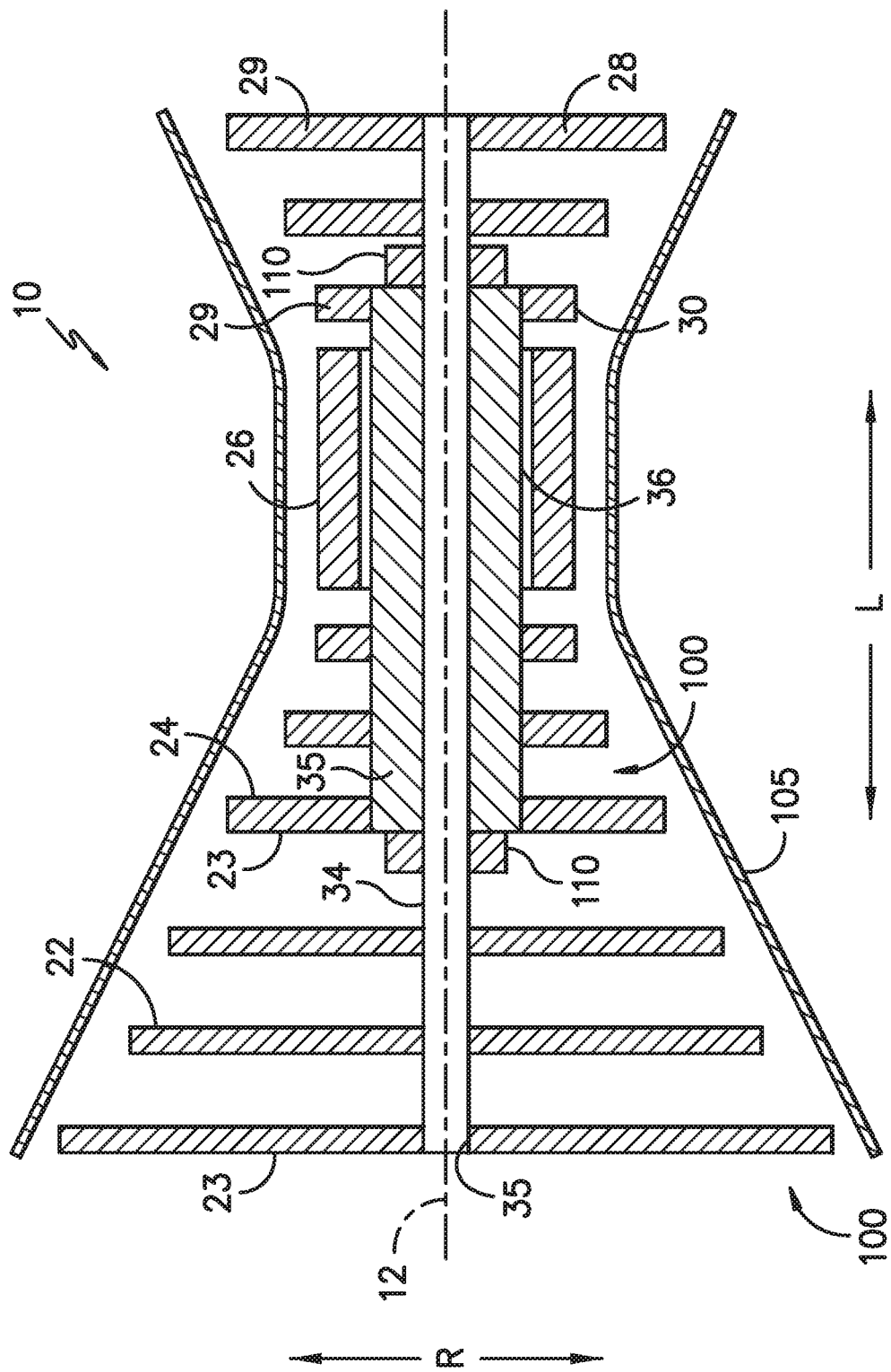

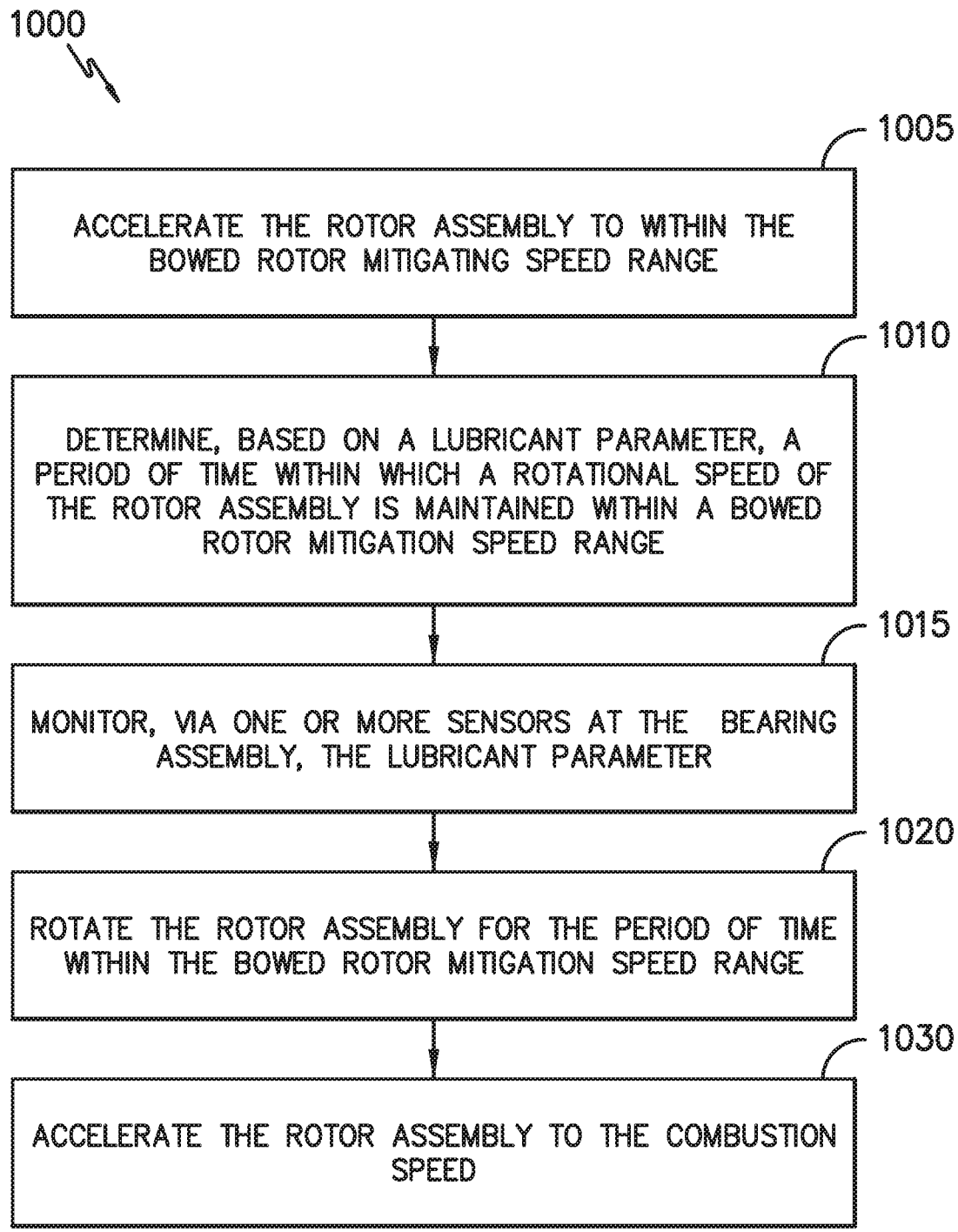
FIG. -2-

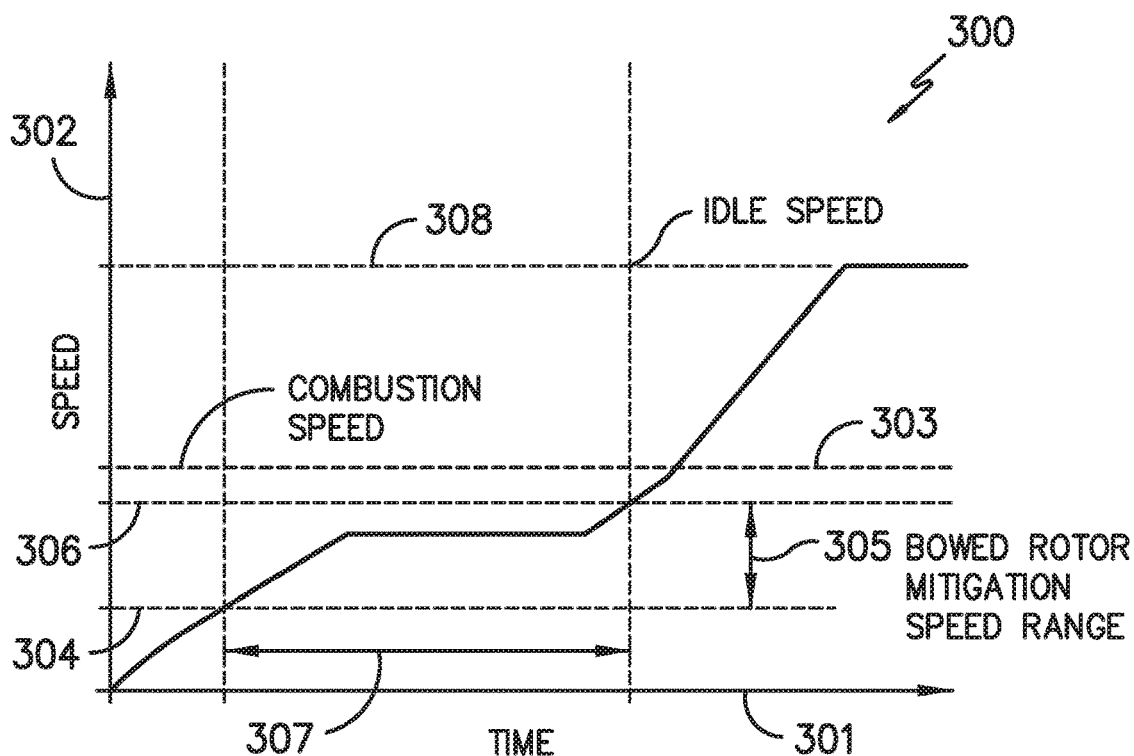
FIG. -3-
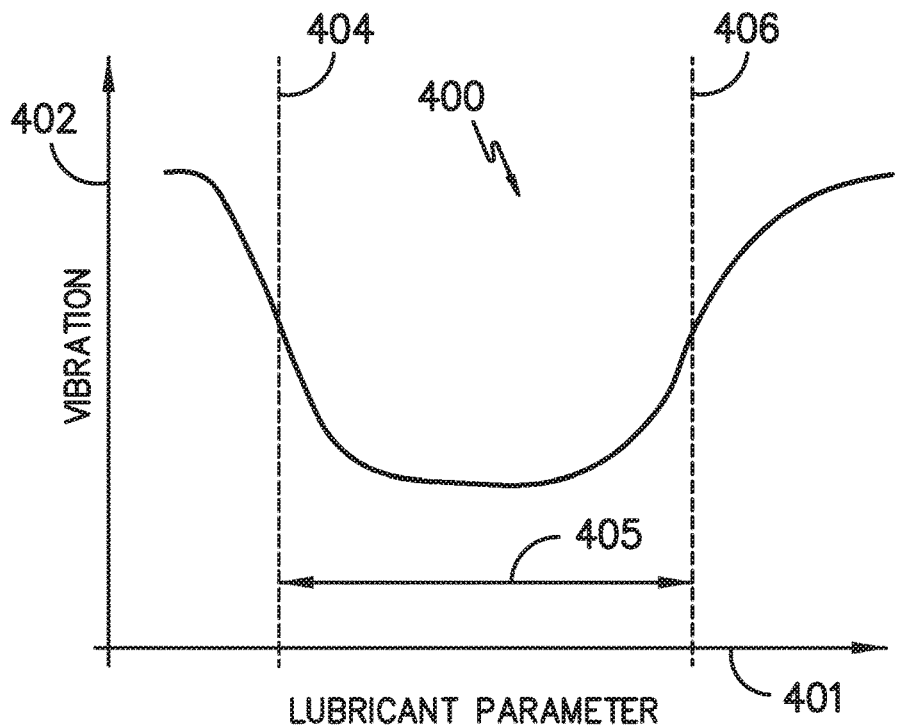
FIG. -4-

METHOD OF STARTING A GAS TURBINE ENGINE

FIELD

The present subject matter is related to methods of operating a gas turbine engine in regard to bowed rotor conditions.

BACKGROUND

Gas turbine engines, such as those providing propulsion for aircraft, generate heat at the rotor assemblies during operation. Following shutdown of the engine, the rotor assembly is stationary (i.e., not rotating), which generally results in asymmetric heat distribution or thermal gradients circumferentially and/or axially along the rotor assembly. Such thermal gradients may generally result in thermal bowing or bowed rotor, such as along the radial, axial, and/or circumferential directions. Bowed rotor results in relatively large eccentricity relative to one or more casings surrounding the rotor assembly. As such, when a rotor assembly resumes operation, such eccentricity may generally cause the rotor assembly to operate with undesirable magnitudes of vibrations such as to damage surrounding casings, bearing assemblies, load structures, etc. Furthermore, such operation of the engine may result in airfoil blade tips rubbing into the surrounding casing, resulting in damage to the blades, the casings, or both.

As such, there is a need for methods for operating a gas turbine engine to mitigate or eliminate a bowed rotor condition of the rotor assembly.

BRIEF DESCRIPTION

Aspects and advantages of the invention will be set forth in part in the following description, or may be obvious from the description, or may be learned through practice of the invention.

Methods of starting a gas turbine engine are generally provided. The engine includes a rotor assembly including a compressor rotor and a turbine rotor each coupled to a shaft. The rotor assembly is coupled to a bearing assembly within a casing enabling rotation of the rotor assembly. The method includes determining, based on a lubricant parameter, a period of time within which a rotational speed of the rotor assembly is maintained within a bowed rotor mitigation speed range defined as less than a combustion speed; and rotating the rotor assembly for the period of time within the bowed rotor mitigation speed range; and accelerating the rotor assembly to the combustion speed to ignite a fuel-oxidizer mixture for combustion.

In various embodiments, the lubricant parameter is at least one of a physical property of a lubricant through the bearing assembly to which the rotor assembly is coupled. In one embodiment, the lubricant parameter is defined at one or more of a lubricant supply conduit, a damper inlet, or a scavenge conduit of the bearing assembly, or combinations thereof. In another embodiment, the lubricant parameter is at least one of a temperature, a pressure, or a flow rate of a lubricant through the bearing assembly to which the rotor assembly is coupled.

In still various embodiments, the method further includes monitoring, via one or more sensors at the bearing assembly, the lubricant parameter. In one embodiment, monitoring the lubricant parameter includes continuously acquiring the lubricant parameter via one or more sensors. In another embodiment, monitoring the lubricant parameter includes intermittent acquisition of the lubricant parameter via one or more sensors. In yet another embodiment, monitoring the lubricant parameter includes acquiring the lubricant parameter when the rotor assembly is within the bowed rotor mitigation speed range. In still another embodiment, monitoring the lubricant parameter includes acquiring the lubricant parameter prior to or during acceleration of the rotor assembly to within the bowed rotor mitigation speed range.

In one embodiment, determining a period of time within which a rotational speed of the rotor assembly is maintained within a bowed rotor mitigation speed range is further based at least on one or more of a temperature, pressure, or density of ambient air outside the gas turbine engine.

In still various embodiments, the method includes accelerating the rotor assembly to within a bowed rotor mitigation speed range; determining a rotor condition based at least on a lubricant parameter range, in which the rotor condition determines whether to accelerate the rotor assembly to the combustion speed or to maintain the rotor assembly within the bowed rotor mitigation speed range; and rotating the rotor assembly based on the rotor condition.

In various embodiments, the lubricant parameter range is defined by a lower limit and an upper limit. In one embodiment, the rotor condition defines a bowed rotor condition when the lubricant parameter is lower than the lower limit or greater than the upper limit of the lubricant parameter range. In another embodiment, rotating the rotor assembly based on the rotor condition includes maintaining the rotor assembly within the bowed rotor mitigation speed range if the rotor condition defines the bowed rotor condition. In still various embodiments, the rotor condition defines an acceptable rotor condition when the lubricant parameter is within the lubricant parameter range based at least on a vibration response. In one embodiment, rotating the rotor assembly based on the rotor condition includes accelerating the rotor assembly to the combustion speed if the lubricant parameter is within the lubricant parameter range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a gas turbine engine in which embodiments of a method for starting the engine may be utilized;

FIG. 2 is a flowchart outlining steps of a method for starting a gas turbine engine, such as the engine depicted in FIG. 1;

FIG. 3 is a graph depicting a change in rotational speed of a rotor assembly of an engine over a period of time; and FIG. 4 is a graph depicting a change in vibratory response versus a lubricant parameter of the engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Embodiments of methods for mitigating and eliminating a bowed rotor condition in a gas turbine engine are generally provided. The embodiments generally provided herein provide reduction or elimination of a bowed rotor condition of a rotor assembly of a gas turbine engine. Various embodiments of the methods control a rotational speed or acceleration of the rotor assembly during startup such as to adjust a period of time within which the rotor assembly is within a bowed rotor mitigation speed range. The methods generally include determining the period of time based at least on a lubricant parameter (e.g. oil within the engine) to reduce or eliminate adverse effects from starting and operating the engine defining a bowed rotor condition. As such, embodiments of the method generally provided herein may improve motoring time to a combustion speed, improve clearance control between the rotor assembly and a surrounding casing, and decrease failures based at least in part on bowed rotor operation (e.g., high cycle fatigue failures). Improved clearance control may decrease deterioration, or a rate thereof, of the engine, which may improve or mitigate degradation of engine performance and operability. For example, improved clearance control may further improve, or mitigate decrease in, specific fuel consumption of the engine. Still further, embodiments of the method provided herein may improve flight safety and engine reliability.

Referring now to the figures, FIGS. 1-2 are schematic views of exemplary embodiments of a gas turbine engine 10 according to an aspect of the present disclosure. The engine 10 defines a longitudinal direction L, a reference axial centerline 12 defined co-directional to the longitudinal direction L, and a radial direction R extended from the axial centerline 12. The engine 10 includes one or more rotor assemblies 100 generally rotatable relative to the axial centerline 12. The rotor assembly 100 generally includes a compressor rotor 23 and a turbine rotor 29 each coupled to a shaft 35. For example, the rotor assembly 100 may define a high pressure (HP) spool including a HP compressor 24 and a HP turbine 30 each coupled to an HP shaft 36. Another rotor assembly 100 of the engine 10 may further define a low pressure (LP) spool including a LP compressor 22 and a LP turbine 28 each coupled to a LP shaft 34. The LP spool may further include a fan or propeller assembly. A combustion system 26 generating combustion gases is disposed in serial flow arrangement between the compressors 22, 24 and the turbines 28, 30.

The rotor assembly 100 is generally surrounded by a casing 105. The casing 105 may generally include shrouds and/or seals proximate to the rotor assembly 100 and generally defining a gas path. The engine 10 further includes a bearing assembly 110 coupled to the rotor assembly 100 and the casing 105. The bearing assembly 110 includes one or more types of bearings, including, but not limited to, roller bearings, tapered roller bearings, thrust bearings (e.g., ball bearings), fluid film bearings, or air bearings, or combinations thereof. The bearing assembly 110 further includes one or more lubricant supply conduits, lubricant scavenge conduits, and damper lines through which a fluid flows. Flow of the fluid, such as oil or other lubricant, through the lubricant supply and scavenge conduits may define one or more of a temperature, pressure, and flow rate of the lubricant. The flow of fluid may further include air or another fluid, or combinations thereof, at the damper line at least partially control a vibratory response at the bearing assembly 110.

The engine 10 may further include one or more sensors disposed at the casing 105, the rotor assembly 100, and/or the bearing assembly 110 to monitor or measure one or more parameters. The sensors may include flow meters, thermocouples, pressure transducers, proximity probes, accelerometers, or other vibration, temperature, pressure, or flow measuring or calculating devices.

It should be appreciated that although not depicted herein, the engine may further include a speed change device, such as a gear assembly, to define a different speed of a fan or propeller assembly versus the remainder of the LP spool. As such, it should be appreciated that the methods described herein may further apply to engines including speed change devices, such as power gear assemblies, reduction gearboxes, planetary gear assemblies, etc.

Referring now to FIG. 2, a flowchart outlining steps of a method of starting a gas turbine engine is generally provided (hereinafter, "method 1000"). The method 1000 may generally be utilized or implemented in a gas turbine engine (e.g., engine 10, FIG. 1) defining a thermal bowing or bowed rotor condition at one or more rotor assemblies. The rotor assembly may define a compressor rotor and a turbine rotor each coupled to a shaft. For example, referring briefly to the engine 10 depicted in FIG. 1, the rotor assembly 100 may include a HP spool defined by the HP compressor 24 and HP turbine 30 each coupled to the HP shaft 36. As another example, the rotor assembly may include a LP spool defined by the LP compressor 22 and LP turbine 28 each coupled to the LP shaft 34. As another example, the rotor assembly may include an intermediate pressure (IP) spool defined by an IP compressor and IP turbine coupled to an IP shaft. The rotor assembly is coupled to a bearing assembly within a casing enabling rotation of the rotor assembly. For example, the bearing assembly may include one or more of the bearing assemblies 60 coupled to the rotor assembly. As described in regard to FIG. 1, the bearing assemblies include supply and scavenge conduits for providing and egressing a flow and pressure of lubricant to and from the bearing assembly. The bearing assembly further includes a damper to generally control bearing vibrations.

It should be appreciated that steps of the method 1000 described herein may be re-ordered, re-arranged, re-sequenced, added or removed without removing from the scope of the present disclosure. Furthermore, although method 1000 may refer to charts generally provided in FIGS. 3-4, it should be understood that the graphs, charts, or curves generally provided are for illustrative purposes. As such, FIGS. 3-4 may define different curves, such as varying linearity or non-linearity, which may not deviate from the scope of the present disclosure.

The method 1000 includes at 1010 determining a period of time within which a rotational speed of the rotor assembly is maintained within a bowed rotor mitigation speed range based at least on a lubricant parameter. The bowed rotor mitigation speed range is defined less than a combustion speed. For example, referring to FIG. 3, an exemplary graph 300 is provided generally depicting a time axis 301 versus a speed axis 302. The speed axis 302 depicts rotational speed of the rotor assembly of the engine. The time axis 301 depicts elapsed time of startup of the engine, i.e., time from when rotor speed begins acceleration toward a combustion speed 303 and an idle speed 308. The combustion speed 303 depicts a speed of the rotor assembly, or alternatively, an air flow rate through the engine, at which fuel is introduced into the combustion section and ignited to produce combustion gases. Production of combustion gases increases rotational speed (and, as a result, air flow rate through the engine) until a minimum steady state speed, defined as the idle speed 308, is attained. The idle speed 308 generally depicts the minimum steady state speed of the rotor assembly given a minimum flow of fuel into the combustion section and a minimum air flow rate thereto and ignited to produce combustion gases.

From zero or rest to the combustion speed 303, rotation of the rotor assembly, and the resulting flow rate of air through the engine, is generally provided by a starter on the engine (e.g., a motor, a motor/generator, an air turbine starter, or other source of motive force for the rotor assembly prior to production of combustion gases). At a range of speeds less than the combustion speed 303 is defined a bowed rotor mitigation speed range 305. The bowed rotor mitigation speed range 305 defines a range of speed less than the combustion speed and greater than zero in between which the rotational speed of the rotor assembly is to remain until the rotor assembly and engine defines an acceptable rotor condition to proceed to accelerate to the combustion speed 303 and greater. For example, the bowed rotor mitigation speed range 305 may be defined by a lower limit 304 of the rotational speed along 302 and an upper limit 306 of the rotational speed along 302 within which the rotor assembly remains for a period of time 307. The period of time 307 is defined along the time axis 301 as the time in which the rotor assembly is to remain within the bowed rotor mitigation speed range 305 (i.e., between the lower limit 304 speed and the upper limit 306 speed).

Referring to the method 1000 at 1010, in various embodiments the lubricant parameter is at least one of a physical property of a lubricant (e.g., oil) through one or more of the bearing assembly to which the rotor assembly is coupled. More specifically, the lubricant parameter may be defined at one or more of a lubricant supply conduit, a damper inlet, or a scavenge conduit of the bearing assembly. Still further, in various embodiments, the physical property of the lubricant parameter may be one or more of on a temperature, pressure, flow rate, viscosity, density, or other physical property of the lubricant as may be measured at one or more of the lubricant supply conduit, the damper inlet, or the scavenge conduit of the bearing assembly. Furthermore, the lubricant parameter may be based on a calculated value of a physical property of the lubricant, such as based on one or more of the temperature, pressure, flow rate, viscosity, density, or chemical composition of the lubricant. Additionally, the lubricant parameter may be based on a calculated value of a physical property of the lubricant further based on a quantity of cycles, an amount of time in which the lubricant has been in the engine, a speed or condition at which the engine has been operated with the lubricant, or combinations thereof. It should be appreciated that "cycles" may refer to engine cycles as may be known in the art, such as, but not limited to, a quantity of occurrences in which the engine rotates above then below a defined speed threshold. However, it should be appreciated that a calculation of "cycles" may differ based on the configuration of gas turbine engine (e.g., turbofan, turboprop, turboshaft, etc.), an apparatus in which the engine is used (e.g., commercial aircraft, military aircraft, etc.), or another time- or cycle-based unit of measurement, or combinations thereof. In still various embodiments, the lubricant parameter at least upon which determining the period of time within which the rotational speed of the rotor assembly is maintained within the bowed rotor mitigation speed range is based may further be based on a pressure, temperature, or flow rate of fluid (e.g., air) within the engine. For example, the temperature, pressure, or flow rate, or combinations thereof, may be measured, monitored, or calculated at one or more of an inlet of the compressor 22, 24, an exit of the HP compressor 24 or inlet of a combustion section, an inlet or exit of the turbines 28, 30, or at an exhaust section of the engine 10. Still further, in various embodiments, determining the period of time within which the rotational speed of the rotor assembly is maintained may be based on a vibration measurement at one or more of internal or external of the casing 105 or at the rotor assembly 100, or combinations thereof.

Referring briefly to FIG. 4, an exemplary graph 400 is generally provided depicting a lubricant parameter axis 401 versus a vibration response axis 402. The lubricant parameter axis 401 depicts a range of values of the lubricant parameter, such as one or a measured or calculated physical property of the lubricant such as described in regard to step 1010 and FIG. 3. The vibration response axis 402 depicts a range of values of vibrations measured or monitored at the engine. In various embodiments, the vibrations may be measured or monitored at one or more of the bearing assembly, the casing, or combinations thereof, to indicate an acceptable or unacceptable vibratory response of the rotor assembly and engine. In various embodiments of the method 1000 and graph 400, the vibration response depicted along the vibration response axis 402 may be pre-determined based at least on the lubricant parameter depicted along the lubricant parameter axis 401. For example, given a measured or calculated lubricant parameter value along the lubricant parameter axis 401, an expected vibration response may be pre-determined along the vibration response axis 302. The graph 400 generally defines a lubricant parameter range 405 within which a value of the lubricant parameter corresponds to a rotor condition. The lubricant parameter range 405 is defined by a lower limit 404 and an upper limit 406. Within the lubricant parameter range 405, the rotor condition is defined as generally acceptable for continued acceleration to the combustion speed and higher. Below the lower limit 404 or above the upper limit 406 defines the rotor condition as a bowed rotor condition, in which the rotational speed of the rotor assembly depicted in graph 300 is to remain within the bowed rotor mitigation speed range 305.

In various embodiments at 1010, determining a period of time (e.g., period of time 307 in FIG. 3) within which the rotational speed of the rotor assembly is maintained within the bowed rotor mitigation speed range (e.g., bowed rotor mitigation speed range 305 in FIG. 3) is based on embodiments of the lubricant parameter such as described herein. For example, referring to FIGS. 3-4, the period of time 307 may be based on a predetermined table, function, chart, lookup table, etc. based on the lubricant parameter. For example, the lubricant parameter may correspond to a period of time in which the rotational speed of the rotor assembly is to remain within the bowed rotor mitigation speed range 305. In various embodiments, remaining within the bowed rotor mitigation speed range 305 may include adjusting an acceleration of the rotor assembly. In another embodiment, remaining within the bowed rotor mitigation speed range 305 may include a generally steady state speed (i.e., approximately zero acceleration) within the bowed rotor mitigation speed range 305.

In another embodiment at 1010, determining the period of time within which the rotational speed of the rotor assembly is maintained within the bowed rotor mitigation speed range is based on a measured or monitored value of the lubricant parameter. For example, referring to FIGS. 3-4, the period of time may be based on receiving a value of the lubricant parameter, comparing the value to the graph 400, and determining whether the value of the lubricant parameter is within the lubricant parameter range 405. In various embodiments, the graph 400 may be predetermined, such as to correspond the lubricant parameter to the vibration response axis 402. In still various embodiments, the determined period of time may further define a period of time in addition to a predetermined time in which the rotor speed is to remain within the bowed rotor mitigation speed range 305. For example, the engine 10 may define a nominal amount of time in which the rotor assembly 100 rotates within the bowed rotor mitigation speed range 305. The method 1000 may further define an extended period of time in addition to the nominal amount of time in which the rotor assembly 100 rotates within the bowed rotor mitigation speed range 305, such as based at least on the lubricant parameter.

As such, the method 1000 may further include at 1015 monitoring or measuring, via one or more sensors at the bearing assembly, the lubricant parameter. Still further, in various embodiments, monitoring the lubricant parameter may include continuously acquiring the lubricant parameter via one or more sensors. For example, continuous acquisition of the lubricant parameter may begin at or before when the rotor assembly begins acceleration (e.g., from approximately zero RPM). As another example, continuous acquisition of the lubricant parameter may begin when the rotational speed is at least approximately at or within the bowed rotor mitigation speed range 305. As yet another example, continuous acquisition of the lubricant parameter may determine when the rotational speed may increase above the bowed rotor mitigation speed range 305 (e.g., to the combustion speed 303 or greater).

In still another embodiment, monitoring the lubricant parameter may include an intermittent acquisition of the lubricant parameter via one or more sensors. For example, intermittent acquisition of the lubricant parameter may begin approximately at a start of acceleration of the rotor assembly from zero or rest. As another example, intermittent acquisition of the lubricant parameter may be approximately at the start of the period of time 307 (e.g., acceleration to approximately the lower limit 304), at the end of the period of time 307, or one or more points therebetween.

Referring back to the method 1000 at 1010, determining the period of time within which the rotational speed of the rotor assembly is maintained within the bowed rotor mitigation speed range may be further based at least on one or more of an environmental condition outside the engine. In various embodiments, the environmental condition includes one or more of a temperature, pressure, or density of ambient air outside the engine. The environmental condition may be measured or monitored and utilized as a function of determining the period of time with the lubricant parameter. For example, a relatively cold environmental condition in addition to the lubricant parameter may yield a period of time different from a relatively hot environmental condition with the same lubricant parameter. As another example, the environmental condition may influence or at least partially determine a rate of change of the lubricant parameter as the rotor assembly accelerates, thereby influencing the period of time within which the rotor assembly is to remain in rotation within the bowed rotor mitigation speed range. In still various embodiments, determining the period of time within which the rotational speed of the rotor assembly is maintained may further be based on a pressure, temperature, or flow rate of fluid (e.g., air) within the engine. For example, the temperature, pressure, or flow rate, or combinations thereof, may be measured, monitored, or calculated at one or more of an inlet of the compressor 22, 24, an exit of the HP compressor 24 or inlet of a combustion section, an inlet or exit of the turbines 28, 30, or at an exhaust section of the engine 10. Still further, in various embodiments, determining the period of time within which the rotational speed of the rotor assembly is maintained may be based on a vibration measurement at one or more of internal or external of the casing 105 or at the rotor assembly 100, or combinations thereof.

The method 1000 further includes at 1005 accelerating the rotor assembly to within the bowed rotor mitigation speed range (e.g., bowed rotor mitigation speed range 305 in FIG. 3). For example, accelerating the rotor assembly may generally be from zero revolutions per minute (RPM) or rest. As another example, accelerating the rotor assembly may generally follow formation of a bowed rotor condition or thermal bowing at the rotor assembly, such as following operation of the engine for a sufficient amount of time and/or at a sufficient power or thrust level to generate a thermal gradient across the rotor assembly.

The method 1000 further includes at 1020 rotating the rotor assembly for the period of time within the bowed rotor mitigation speed range. During the period of time within which the rotor assembly rotates within the bowed rotor mitigation speed range, a thermal gradient at the rotor assembly decreases. As a result, the bowed rotor condition is diminished or eliminated. Following the period of time, the method 1000 further includes at 1030 accelerating the rotor assembly to the combustion speed (e.g., combustion speed 303 in FIG. 3) to ignite a fuel-oxidizer mixture to produce combustion gases.

The embodiments of the method 1000 generally provided herein may reduce or eliminate a thermal gradient at the rotor assembly (e.g., rotor assembly 100) such as to reduce or eliminate undesired vibratory responses associated with a bowed rotor condition. Furthermore, reduction or elimination of the thermal gradient may further reduce or eliminate eccentricity (i.e., non-concentricity) of the rotor assembly 100 relative to the casing 105 and/or the axial centerline 12 of the engine 10. The embodiments of the method 1000 generally described herein generally determine a period of time in which the rotor assembly rotates within the bowed rotor mitigation speed range based on one or more of the lubricant parameters. The lubricant parameter, or a range thereof, may generally correspond to a rotor condition, such as an acceptable condition in which further acceleration to a combustion speed and beyond is permitted or generally safe for the engine, or a bowed rotor condition, in which acceleration is reduced or eliminated and the rotational speed of the rotor assembly remains within the bowed rotor mitigation speed range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of starting a gas turbine engine, wherein the engine comprises a rotor assembly including a compressor rotor and a turbine rotor each coupled to a shaft, wherein the rotor assembly is coupled to a bearing assembly within a casing allowing rotation of the rotor assembly, the method comprising:
measuring or monitoring a lubricant parameter of a lubricant within the gas turbine engine;
determining an expected vibration response of at least a portion of the engine based on the lubricant parameter and a predetermined correlation between the lubricant parameter and a vibration response;
determining, based on the expected vibration response a period of time within which a rotational speed of the rotor assembly is maintained within a bowed rotor mitigation speed range, wherein the bowed rotor mitigation speed range is defined as less than a combustion speed;
rotating the rotor assembly for the period of time within the bowed rotor mitigation speed range;
determining a rotor condition based at least on a lubricant parameter range comprising an upper limit and a lower limit of the lubricant parameter, and wherein the upper limit and the lower limit correspond to an upper limit and a lower limit of the expected vibration response based on the predetermined correlation, wherein the rotor condition comprises an acceptable rotor condition when the expected vibration response is within the upper limit and the lower limit of the expected vibration response, and wherein the rotor condition comprises a bowed rotor condition when the expected vibration response is lower than the lower limit of the expected vibration response or greater than the upper limit of the expected vibration response;
rotating the rotor assembly within the bowed rotor mitigation speed range when the rotor condition is the bowed rotor condition; and
accelerating the rotor assembly to the combustion speed to ignite a fuel-oxidizer mixture for combustion when the rotor condition is the acceptable rotor condition.

2. The method of claim 1, wherein the lubricant parameter is at least one of a physical property of a lubricant through the bearing assembly to which the rotor assembly is coupled.

3. The method of claim 2, wherein the lubricant parameter is defined at one or more of a lubricant supply conduit, a damper inlet, or a scavenge conduit of the bearing assembly, or combinations thereof.

4. The method of claim 1, wherein the monitoring of the lubricant parameter is performed using one or more sensors at the bearing assembly.

5. The method of claim 4, wherein the monitoring of the lubricant parameter includes continuously acquiring the lubricant parameter via the one or more sensors.

6. The method of claim 4, wherein the monitoring of the lubricant parameter includes intermittent acquisition of the lubricant parameter via the one or more sensors.

7. The method of claim 1, wherein determining the period of time within which the rotational speed of the rotor assembly is maintained within the bowed rotor mitigation speed range is further based at least on one or more of a temperature, pressure, or density of ambient air outside the gas turbine engine.

8. A method of starting a gas turbine engine, wherein the engine comprises a rotor assembly including a compressor rotor and a turbine rotor each coupled to a shaft, wherein the rotor assembly is coupled to a bearing assembly within a casing allowing rotation of the rotor assembly, the method comprising:
measuring or monitoring a lubricant parameter of a lubricant within the gas turbine engine;
determining an expected vibration response of at least a portion of the engine based on the lubricant parameter and a predetermined correlation between the lubricant parameter and vibration response;
accelerating the rotor assembly to within a bowed rotor mitigation speed range, wherein the bowed rotor mitigation speed range is defined as less than a combustion speed;
determining a rotor condition based at least on a lubricant parameter range, wherein the lubricant parameter range is defined between a lower limit and an upper limit, wherein the upper limit and the lower limit of the lubricant parameter range correspond to an upper limit and a lower limit of the expected vibration response based on the predetermined correlation, and wherein the rotor condition comprises an acceptable rotor condition when the expected vibration response is within the upper limit and the lower limit of the expected vibration response, and wherein the rotor condition comprises a bowed rotor condition when the expected vibration response is lower than the lower limit of the expected vibration response or greater than the upper limit of the expected vibration response; and
rotating the rotor assembly to the combustion speed when the rotor condition is the acceptable rotor condition, and maintaining the rotor assembly within the bowed rotor mitigation speed range when the rotor condition is the bowed rotor condition.

9. The method of claim 8, wherein the monitoring of the lubricant parameter is performed using one or more sensors at the bearing assembly.

10. The method of claim 9, wherein the monitoring of the lubricant parameter includes a single, a continuous, or an intermittent acquisition of the lubricant parameter.

11. The method of claim 9, wherein the monitoring of the lubricant parameter includes acquiring the lubricant parameter when the rotor assembly is within the bowed rotor mitigation speed range.

12. The method of claim 9, wherein the monitoring of the lubricant parameter includes acquiring the lubricant parameter prior to or during acceleration of the rotor assembly to within the bowed rotor mitigation speed range.

13. The method of claim 8, wherein the lubricant parameter is at least one of a temperature, a pressure, or a flow rate of a lubricant through the bearing assembly to which the rotor assembly is coupled.

14. The method of claim 13, wherein the lubricant parameter is defined at one or more of a lubricant supply conduit, a damper inlet, or a scavenge conduit of the bearing assembly, or combinations thereof.

15. The method of claim 8, further comprising:
determining, based on the expected vibration response, a period of time within which a rotational speed of the rotor assembly is maintained within the bowed rotor mitigation speed range.

* * * * *